United States Patent [19]
Urushima

[11] Patent Number: 5,287,298
[45] Date of Patent: Feb. 15, 1994

[54] OSCILLATION CONTROL APPARATUS FOR A PORTABLE BATTERY-DRIVEN TERMINAL

[75] Inventor: Tetsuro Urushima, Yokohama, Japan

[73] Assignee: Matsushita Electric Industrial Co., Ltd., Osaka, Japan

[21] Appl. No.: 985,521

[22] Filed: Dec. 2, 1992

Related U.S. Application Data

[63] Continuation-in-part of Ser. No. 778,282, Oct. 17, 1991, abandoned.

[30] Foreign Application Priority Data

Oct. 23, 1990 [JP] Japan .................. 2-285297

[51] Int. Cl.⁵ .............................................. G06F 1/04
[52] U.S. Cl. ............................................... 364/707
[58] Field of Search .................................. 364/707

[56] References Cited
U.S. PATENT DOCUMENTS

| | | | |
|---|---|---|---|
| 3,941,989 | 3/1976 | McLaughlin et al. | 364/707 |
| 4,285,043 | 8/1981 | Hashimoto et al. | 364/707 |
| 4,317,181 | 2/1982 | Teza et al. | 364/707 |
| 4,409,665 | 10/1983 | Tubbs | 364/707 |
| 4,479,191 | 10/1984 | Nojima et al. | 364/707 |
| 4,570,219 | 2/1986 | Shibukawa et al. | 364/707 |

*Primary Examiner*—David H. Malzahn
*Attorney, Agent, or Firm*—Stevens, Davis, Miller & Mosher

[57] ABSTRACT

A novel terminal apparatus of low power consumption type is disclosed, in which an oscillation circuit is controlled to be energized only when a CPU is operated and de-energized otherwise, thus remarkably reducing power consumption. The progress of the CPU technology has made it possible to stop oscillation temporarily without sacrificing the CPU operation, unlike the conventional CPU circuit whose operation cannot be assured without constant application of an oscillation frequency thereto.

1 Claim, 3 Drawing Sheets

F I G. 1
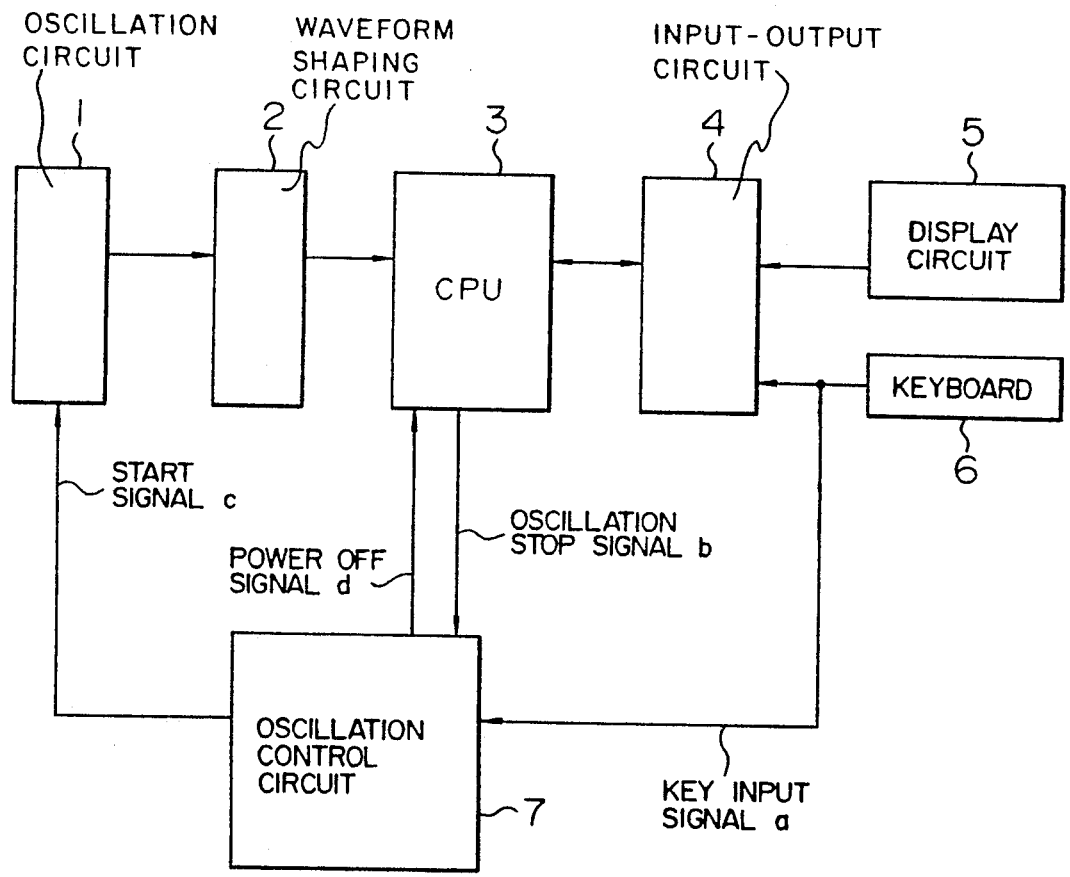

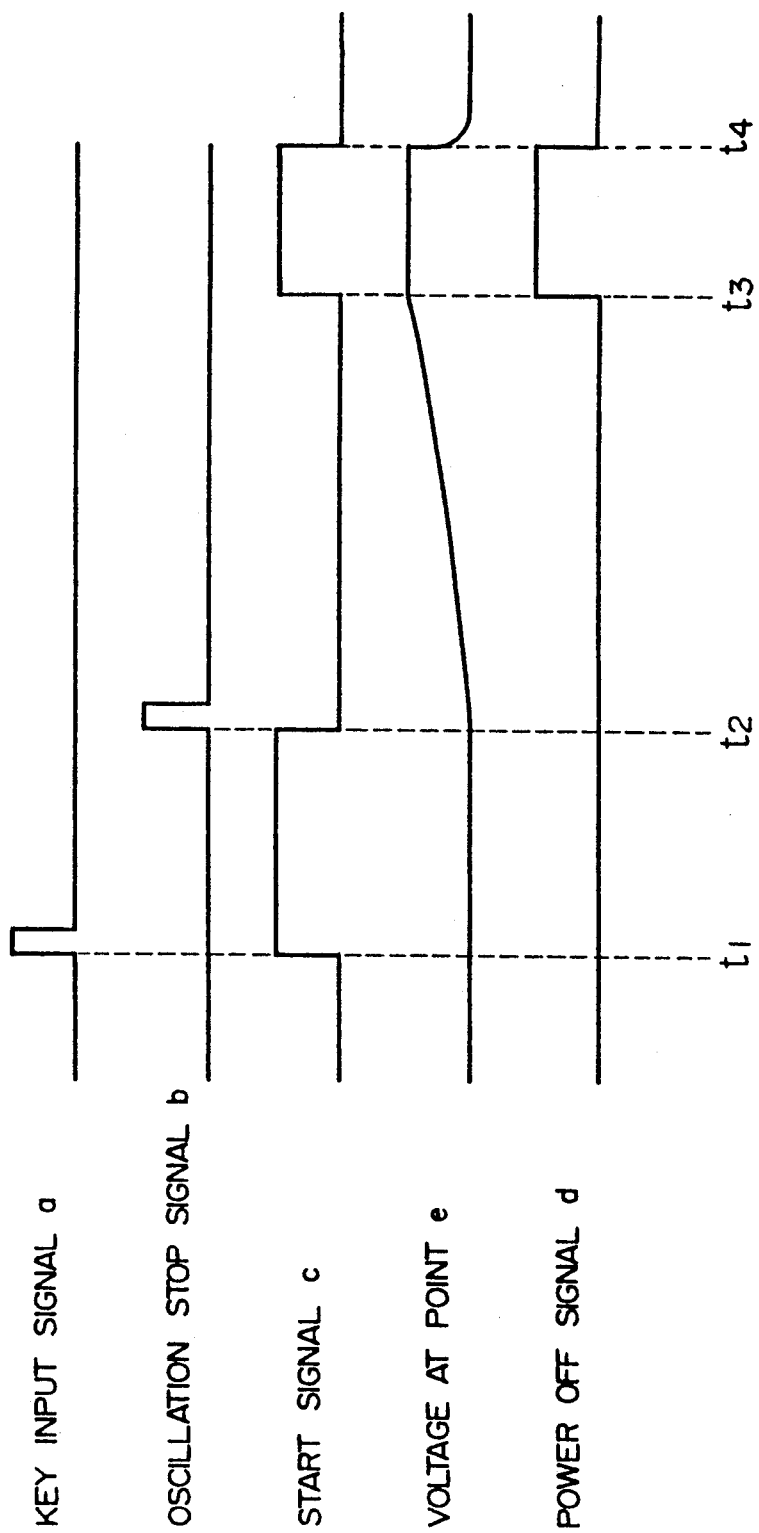

OSCILLATION CONTROL APPARATUS FOR A PORTABLE BATTERY-DRIVEN TERMINAL

This application is a continuation-in-part of application Ser. No. 07/778,282, filed Oct. 17, 1991, now abandoned.

BACKGROUND OF THE INVENTION

The present invention relates to a portable terminal apparatus of battery-powered type.

In conventional portable terminal apparatuses of this type, power is supplied for a CPU constantly from a battery while a power supply is turned on thereby to drive an oscillation circuit normally. The oscillation circuit, therefore, consumes electric power all the time regardless of the operation of the CPU.

In order to meet the present-day demand for smaller and lighter industrial equipment, however, portable terminal apparatuses are required to be reduced in power consumption.

The portable terminal apparatuses now in use comprises a C-MOS device and consumes electric power increasing in proportion to the operating frequency. Although a lower frequency is a measure for reducing the power consumption, the processing speed of the CPU would be decreased. The disadvantage of the conventional portable terminal apparatuses, therefore, cannot be obviated simply by reducing the power consumption.

SUMMARY OF THE INVENTION

The present invention has been developed in order to obviate the above-mentioned problem of the conventional apparatuses, and the object thereof is to provide a superior portable terminal apparatus improved in power consumption without reducing the processing speed of the CPU.

In order to achieve the above-mentioned object, according to one aspect of the present invention, there is provided a portable terminal apparatus in which an oscillation circuit is controlled to be energized only during the operation of a CPU and to be de-energized while the CPU is not operating.

According to the above-described configuration in which the oscillation circuit is energized only while the CPU is energized, power consumption is reduced remarkably.

The operation of conventional CPU circuits cannot be assured unless a predetermined oscillating frequency is applied thereto. With the progress of the CPU technology, however, a CPU has been developed which operates from direct current, thereby making it possible to operate the CPU even when oscillation is stopped temporarily.

BRIEF DESCRIPTION OF THE DRAWINGS

FIG. 1 is a block diagram of a portable terminal apparatus according to an embodiment of the present invention.

FIG. 3 shows signal waveforms according to the same embodiment.

DESCRIPTION OF THE PREFERRED EMBODIMENT

Figure 2:
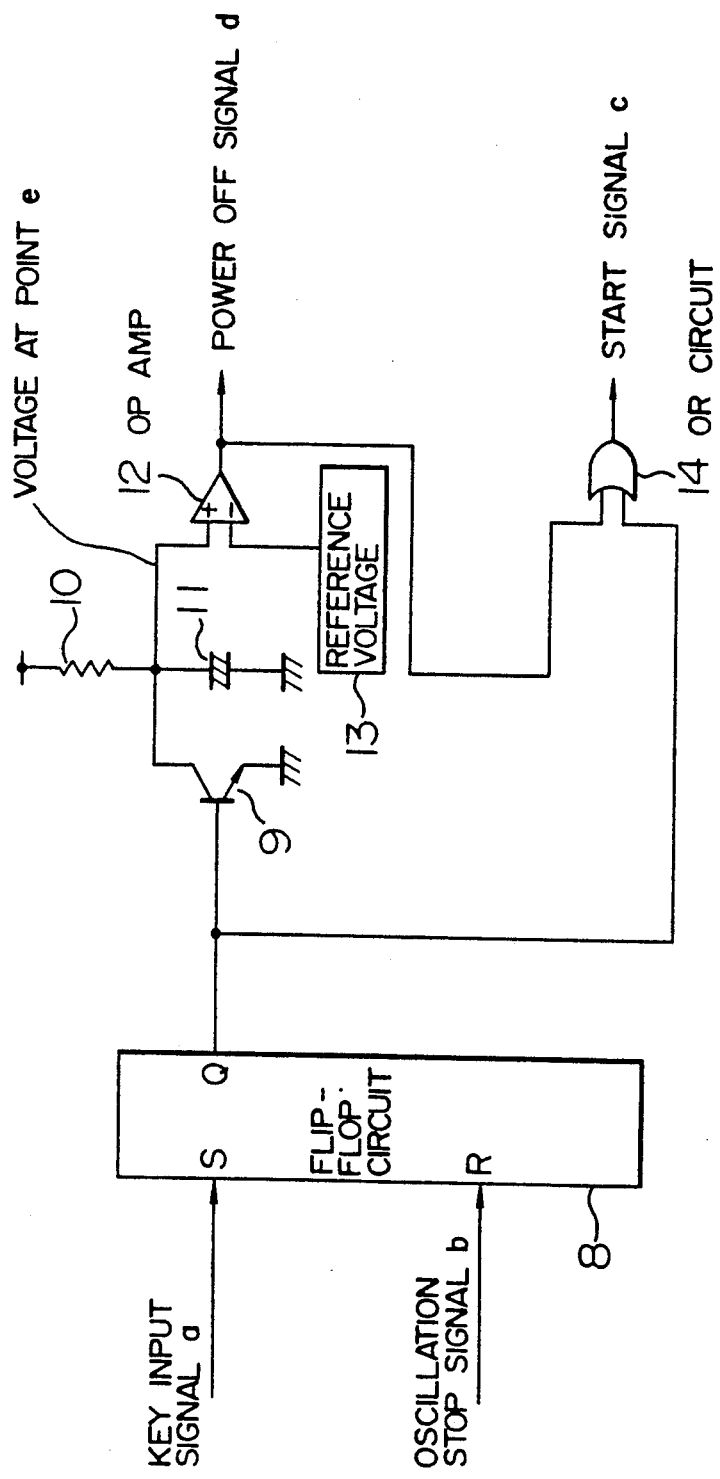
FIG. 2 is a circuit diagram showing a configuration of an oscillation control circuit according to the same embodiment.

The configuration of an embodiment of the present invention is shown in FIG. 1. In FIG. 1, reference numeral 1 designates an oscillation circuit, numeral 2 a waveform shaping circuit, numeral 3 a CPU operated from direct current, numeral 4 an input-output circuit, numeral 5 a display circuit, numeral 6 a keyboard, and numeral 7 an oscillation control circuit.

A circuit diagram representing a configuration of the oscillation control circuit 7 is shown in FIG. 2. Numeral 8 designates a flip-flop circuit, numeral 9 a transistor, numeral 10 a resistor, numeral 11 a capacitor, numeral 12 an operational amplifier circuit, numeral 13 a reference voltage, and numeral 14 an OR circuit.

Now, the operation of the above-mentioned embodiment will be explained with reference to the signal waveforms shown in FIG. 3. In the above-mentioned embodiment, the oscillation circuit 1 is normally stopped, and therefore the power consumption thereof is kept minimum. Upon application of a key input signal a from the keyboard 6, the same signal a is applied to the oscillation control circuit 7 thereby to energize the control circuit 7, whereby a start signal c is produced to energize the oscillation circuit 1. The oscillation signal produced from the oscillation circuit 1 is applied through the waveform shaping circuit 2 to the CPU 3. The CPU 3, upon completion of the operation of the functions assigned to the key input signal a from the keyboard 6, applies an oscillation stop signal b to the oscillation control circuit 7. In response to the oscillation stop signal b, the oscillation control circuit 7 stops producing the start signal c thereby to de-energize the oscillation circuit 1. In the case where no key input is applied to the oscillation control circuit 7 for a long time (about 5 minutes), an internal timer circuit is energized automatically and a power-off signal d is sent out by circuit 7. This power-off signal is for forcibly causing the CPU 3 to execute the power-off operation and to realize a power-off situation automatically when the portable terminal apparatus is left unattended.

However, if the starting signal c were stopped just after the power-off signal d is sent out, the CPU 3 would stop its performance and hence the data under processing would unfavorably be lost.

In order to solve this problem, in the present invention, the power-off signal d is also applied to the OR circuit 14 so as to send the starting signal c to the oscillation circuit 1 for a while, and consequently time is secured for storing the data under processing in a memory.

FIG. 2, the flip-flop circuit 8 is set by the key input signal a and reset by the oscillation stop signal b. When the key input signal is inputted, an output Q and the start signal c are produced at the same time and also a power source is applied to the resistor 10. Upon production of the output Q, the transistor 9 is turned on, and a time constant circuit, i.e., a timer circuit including the resistor 10 and the capacitor 11 is de-energized.

When the Q output signal is stopped in response to the application of the oscillation stop signal b, on the other hand, the transistor 9 is turned off. As a result, the timer circuit determined by the time constant due to the resistor 10 and the capacitor 11 is energized, and the voltage at point e increases. When the voltage at point e exceeds the reference voltage 13, a power-off signal d is produced from the operational amplifier 12.

At the same time, since the power-off signal d is connected to the input terminal of the OR circuit 14, the starting signal c is sent to the oscillation circuit 1, and consequently, the CPU 3 performs power-off operations such as storing the data under processing into the memory.

After that at $t_4$, the application of the power source to the resistor 10 is stopped, and thus the voltage at point e decreases and the starting signal c is stopped. And finally, the oscillation circuit 1 stops its performance.

In the above-mentioned embodiment, the power consumption for operation is given as $$Pd = 5\ V \times 50\ mA = 250\ mW$$

while the power consumption with the oscillation stopped is expressed as $$P_s = 5\ V \times 5\ mA = 25\ mW$$

Thus the reduction rate is $$Ps/Pd = 10\%$$

showing that power is saved by about 10% as compared with the conventional apparatuses.

It will thus be understood from the foregoing description that according to the present invention the oscillation circuit is de-energized while the CPU is turned off, and therefore the power consumption can be reduced remarkably.

What is claimed is:

1. A low power consumption portable terminal comprising:

an input device for generating an input signal;

a CPU adapted to be powered by a direct current supply means;

an oscillation control means, operatively associated with at least said input device, for receiving said input signal and generating a first start signal in response to said input signal; and an oscillation circuit, operatively associated with said CPU and said oscillation control means, for receiving said first start signal and generating and supplying an oscillation signal to said CPU in response to said first start signal, wherein:

said oscillation control means is operatively associated with said CPU;

said CPU further comprises:

means for performing at least one operation in response to said oscillation signal, and means for generating and supplying a stop signal to said oscillation control means, after completion of said at least one operation;

said oscillation control means further comprises means for ceasing said first start signal in response to said stop signal; and whereby said oscillation circuit ceases said oscillation signal in an absence of said first start signal, and wherein said oscillation control means further comprises:

a timer unit comprising means for monitoring an amount of time between generation of said stop signal and an input signal, means for comparing said amount of time with a predetermined threshold, and means for generating and supplying a DC power shut off signal to said CPU when said amount of time is greater than said predetermined threshold; whereby said DC power shut off signal shuts off said CPU.

* * * * *